(12) United States Patent
Becker et al.

(10) Patent No.: US 7,434,885 B2
(45) Date of Patent: Oct. 14, 2008

(54) SEAT BACK HINGE MOUNTING FOR A FORWARDLY FOLDABLE MOTOR VEHICLE SEAT

(75) Inventors: Burckhard Becker, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 11/376,495

(22) Filed: Mar. 15, 2006

(65) Prior Publication Data
US 2006/0267391 A1 Nov. 30, 2006

(30) Foreign Application Priority Data
Mar. 15, 2005 (DE) .................. 10 2005 012 183

(51) Int. Cl.
 *B60N 2/02* (2006.01)
 *B60N 2/00* (2006.01)
(52) U.S. Cl. .............................. 297/378.12; 297/354.1
(58) Field of Classification Search ............ 297/378.12, 297/354.1
 See application file for complete search history.

(56) References Cited

U.S. PATENT DOCUMENTS

| | | | | |
|---|---|---|---|---|
| 6,139,105 | A * | 10/2000 | Morgos et al. ......... | 297/378.12 |
| 6,685,270 | B2 * | 2/2004 | Haglund .................. | 297/367 |
| 6,926,362 | B2 * | 8/2005 | Kroner et al. .......... | 297/354.12 |
| 6,968,598 | B2 * | 11/2005 | Becker et al. .......... | 16/349 |
| 2004/0056524 | A1 * | 3/2004 | O'Connor ............... | 297/378.12 |
| 2005/0156455 | A1 * | 7/2005 | Deptolla ................. | 297/378.12 |
| 2005/0212341 | A1 * | 9/2005 | Coughlin et al. ....... | 297/378.12 |

FOREIGN PATENT DOCUMENTS

| | | |
|---|---|---|
| DE | 197 57 110 C1 | 11/1998 |
| DE | 197 57 111 C1 | 11/1998 |
| DE | 20 2004 010 645 U1 | 9/2004 |
| EP | 0 844 133 B1 | 7/2001 |

* cited by examiner

*Primary Examiner*—Sarah B McPartlin
(74) *Attorney, Agent, or Firm*—McCarter & English, LLP

(57) ABSTRACT

A seat back hinge mounting for a forwardly foldable motor vehicle seat having a first hinge arm and a second hinge arm adapted for relative rotation about a hinge pin. A locking cam is disposed on said second hinge arm and is movable between a locking position and a release position. A first stop flange and a second stop flange are provided on the first hinge arm. The locking cam cooperates with the second stop flange in the locking position and has come free from said second stop flange in the release position. A retainer lug, which is bound by said first stop flange and by said second stop flange in the circumferential direction, is provided on the first hinge arm. A limit stop cooperating with the first stop flange and being spaced the same radial distance apart from the hinge pin as the first stop flange is disposed on the second hinge arm. A retainer device prevents the locking cam from moving from the release position into a region which on the one side is located between the first stop flange and the retainer lug and which on the other side is defined by an arc of a circle about the hinge pin and by the radius of the free end of the retainer lug.

12 Claims, 6 Drawing Sheets

SEAT BACK HINGE MOUNTING FOR A FORWARDLY FOLDABLE MOTOR VEHICLE SEAT

CROSS-REFERENCE TO RELATED APPLICATIONS

This application claims priority to German Application No. DE 10 2005 012 183.7, filed Mar. 15, 2005, the contents of which are expressly incorporated by reference in their entirety as part of the present disclosure.

BACKGROUND

The invention relates to a seat back hinge mounting for a forwardly foldable motor vehicle seat, with a first hinge arm and a second hinge arm adapted for relative rotation about a hinge pin, a locking cam, which is disposed on the second hinge arm and is movable between a locking position and a release position, being provided, a first stop flange and a second stop flange being provided on the first hinge arm and the locking cam cooperating with the second stop flange in the locking position and having come free from said second stop flange in the release position.

Such a hinge mounting is known from the document DE 20 2004 010 645 U1. In principle, such type hinge mountings have proved efficient. They are particularly suited for use in motor vehicles comprising but one side door on either side of the vehicle and, in addition thereto, rear seats. As it is usual for front seats of such type vehicles the seat back can be folded forward and the seat moved forward quickly in order to facilitate access to the rear seats. Such type forwardly movable vehicle seats are known from the documents EP 0 844 133 B1, U.S. Pat. No. 5,893,610, DE 197 57 110 C1 and DE 197 57 111 C1 for example.

On the prior art motor vehicle seats, forward movement of the seat is enabled by pivoting the seat back forward after having actuated a corresponding disengagement lever provided thereon. This pivot movement allows catch devices of the longitudinal guide of the vehicle seat to come free. As a result, the vehicle seat can be moved forward in the longitudinal guide. Usually, a memory unit that permits to find back to the initial starting position is also provided.

Upon actuation of the disengagement lever, the locking cam moves from its normal locking position into the release position. To achieve this state, the actuation lever usually is only briefly actuated. As soon as the disengagement lever is no longer actuated, the locking cam can, in principle, fall back into its earlier position. Usually, the locking cam is biased into the locking position by an elastic means. This however may disturb the functioning process.

SUMMARY OF THE INVENTION

It is the object of the invention to develop the hinge mounting of the type mentioned herein above in such a manner that the locking cam substantially remains in the release position even if it is no longer actuated in the release position by the disengagement lever, and in any case, that it is prevented from interfering with the range of motion of other parts and more specifically from blocking the seat back.

This object is solved by the hinge mounting having the following features. The hinge mounting comprises a first hinge arm and a second hinge arm adapted for relative rotation about a hinge pin, and a locking cam, which is disposed on said second hinge arm and is movable between a locking position and a release position. A first stop flange and a second stop flange are provided on the first hinge arm. The locking cam cooperates with the second stop flange in the locking position, but does not cooperate with the second stop flange in the release position. Additionally, the hinge mounting includes a retainer lug, which is bound in a circumferential direction by the first stop flange and the second stop flange, and is provided on the first hinge arm. Further included is a limit stop disposed on the hinge arm, which cooperates with the first stop flange and is spaced the same radial distance apart from the hinge pin as the first stop flange. The hinge mounting further comprises a retainer device, which prevents the locking cam from moving from the release position into a forbidden region. On one side, the forbidden region is located between the first stop flange and the limit stop and, on another side, the forbidden region is defined by an arc of a circle about the hinge pin and by the radius of the free end of the retainer lug.

On the hinge mounting of the invention, the retainer device performs the task of retaining the locking cam out of engagement with the stopper nose as long as the seat back is folded forward. It is not until the seat back has returned to the initial position, at least in proximity to the initial position, that the retainer device will be no longer needed. At least, the retainer device no longer influences the locking cam when the latter is in a position in which it is allowed to cooperate with the second stop flange, that is, when it is allowed to assume again the locking position.

Put another way, the invention aims at preventing the locking cam from being moved, on the wrong side of the stopper nose, into the range of motion of said stopper nose and from hindering the movement thereof. Usually, there is provided a control lever which is, directly or indirectly, connected to the release lever. It controls the movement of the locking cam. The invention also ensures that the control lever will always remain engaged with the locking lever.

Preferably, the first hinge arm is connected to an underframe and the second hinge arm is solidly connected to the seat back. Accordingly, the stopper nose remains stationary when the seat back is being folded forward. The second hinge arm moves relative to the stopper nose. The locking cam moves together with it. The retainer device prevents the locking cam from entering the "forbidden" region. Instead, the locking cam is retained in the release position as long as the seat back is folded forward.

BRIEF DESCRIPTION OF THE DRAWINGS

Other features and advantages will become more apparent upon reviewing the appended claims and the following non restrictive description of embodiments of the invention, given by way of example only with reference to the drawing. In said drawing:

DETAILED DESCRIPTION OF THE INVENTION

Figure 1:
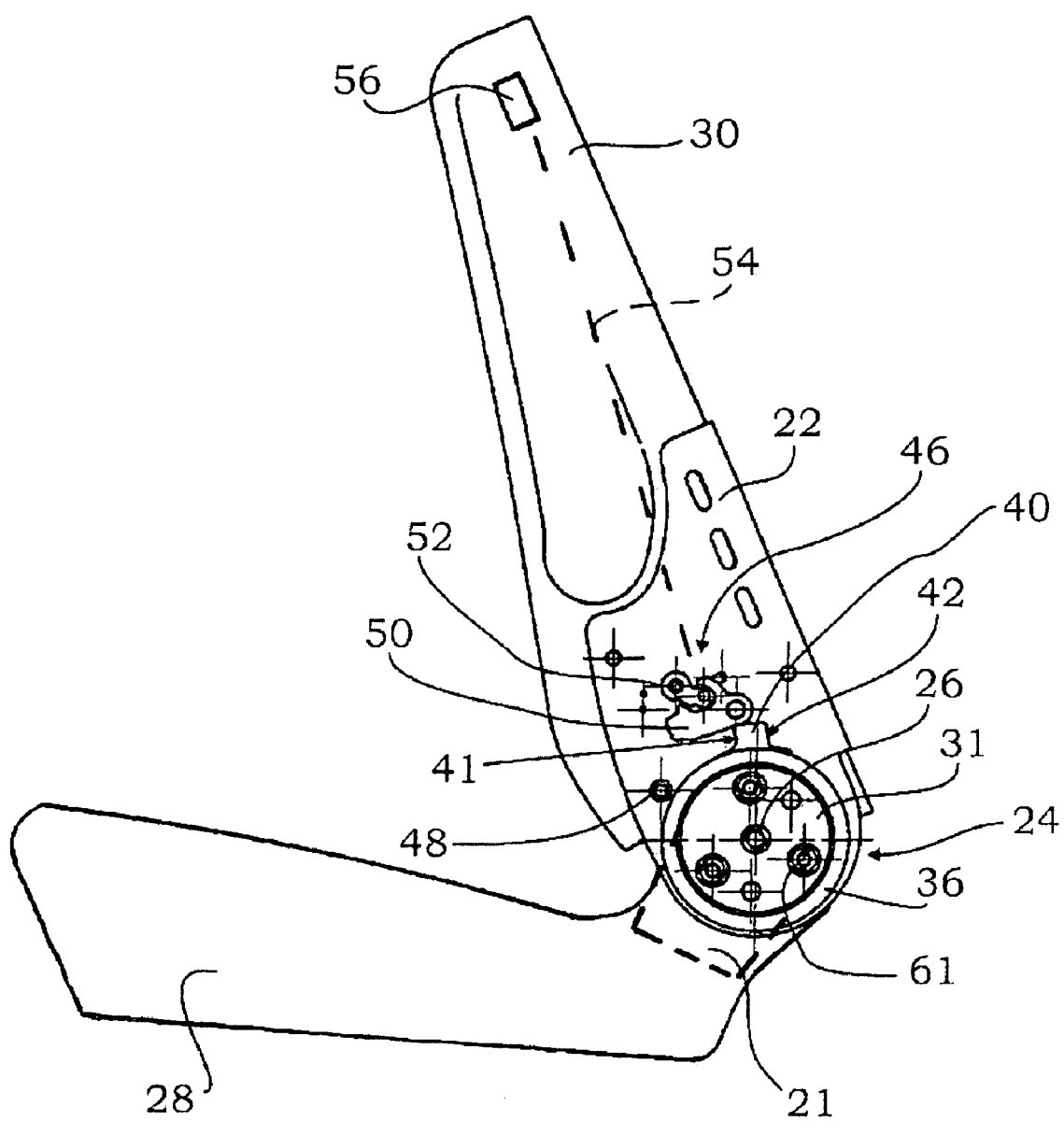
FIG. 1 shows a schematic side view of a motor vehicle seat, with the seat being folded forward.
Figure 2:
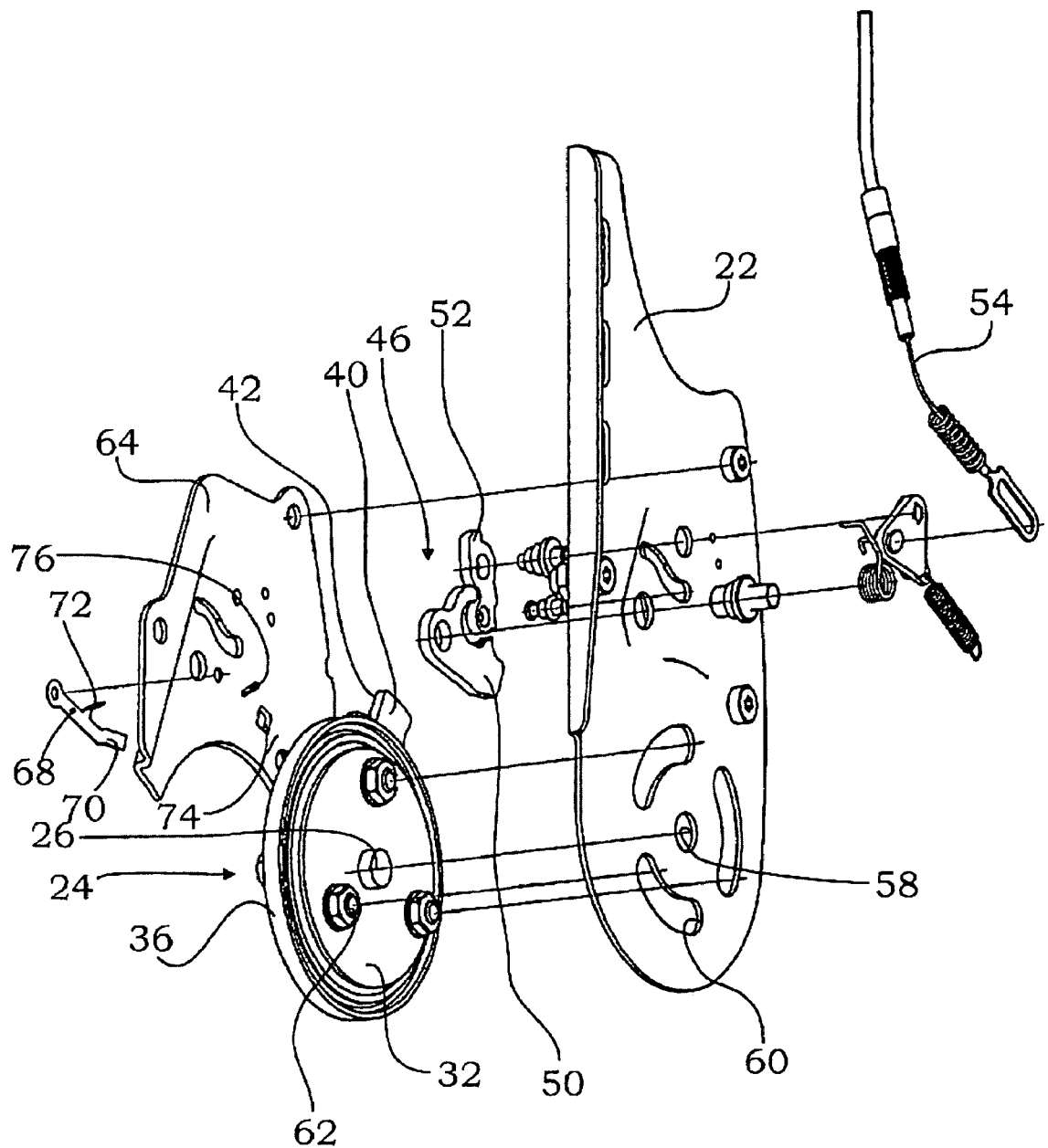
FIG. 2 shows a perspective illustration of the hinge mounting of FIG. 1 in the form of an assembly drawing, but without first hinge arm.
Figure 3:
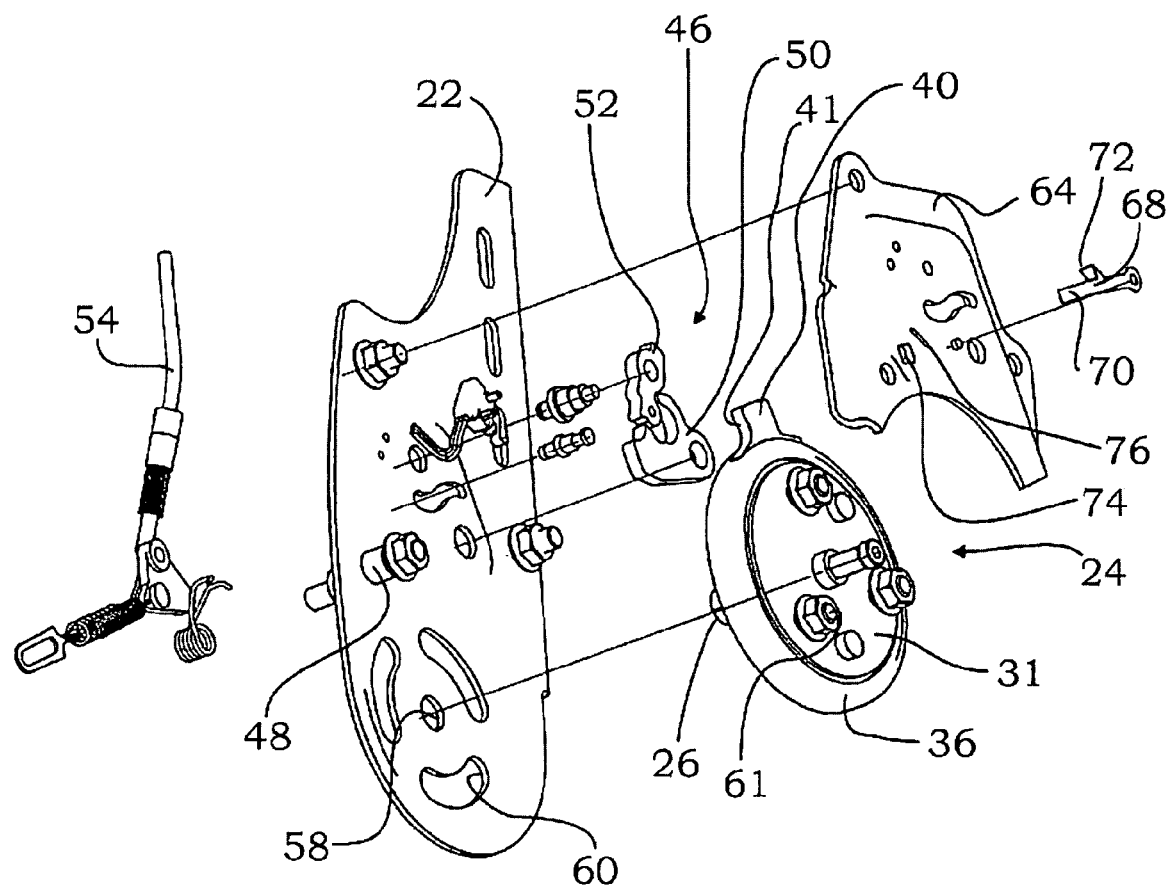
FIG. 3 is a perspective illustration of the arrangement of FIG. 2, but now viewed from the opposite direction.
Figure 4:
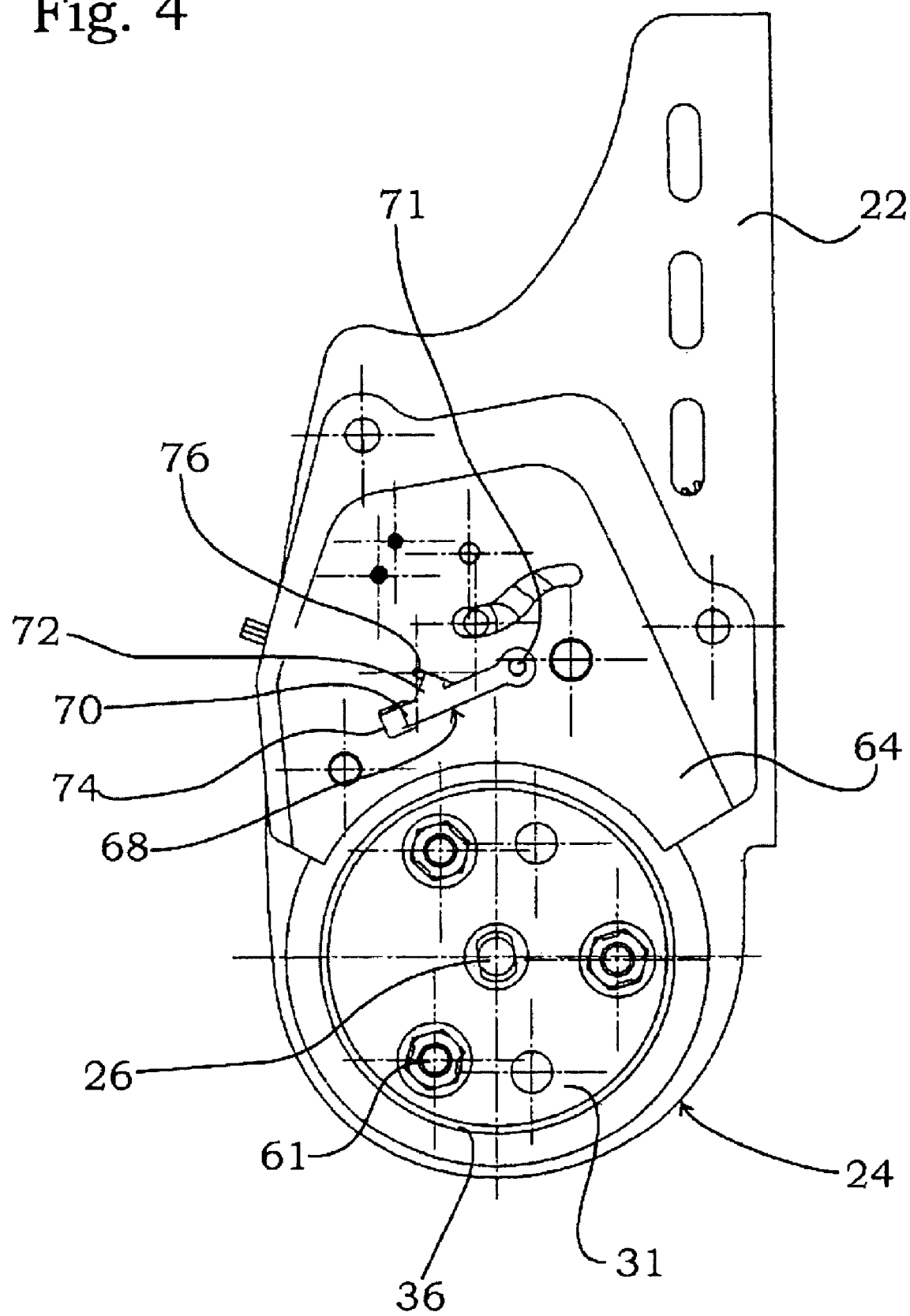
FIG. 4 shows a top view of another hinge mounting, again without first hinge arm.
Figure 5:
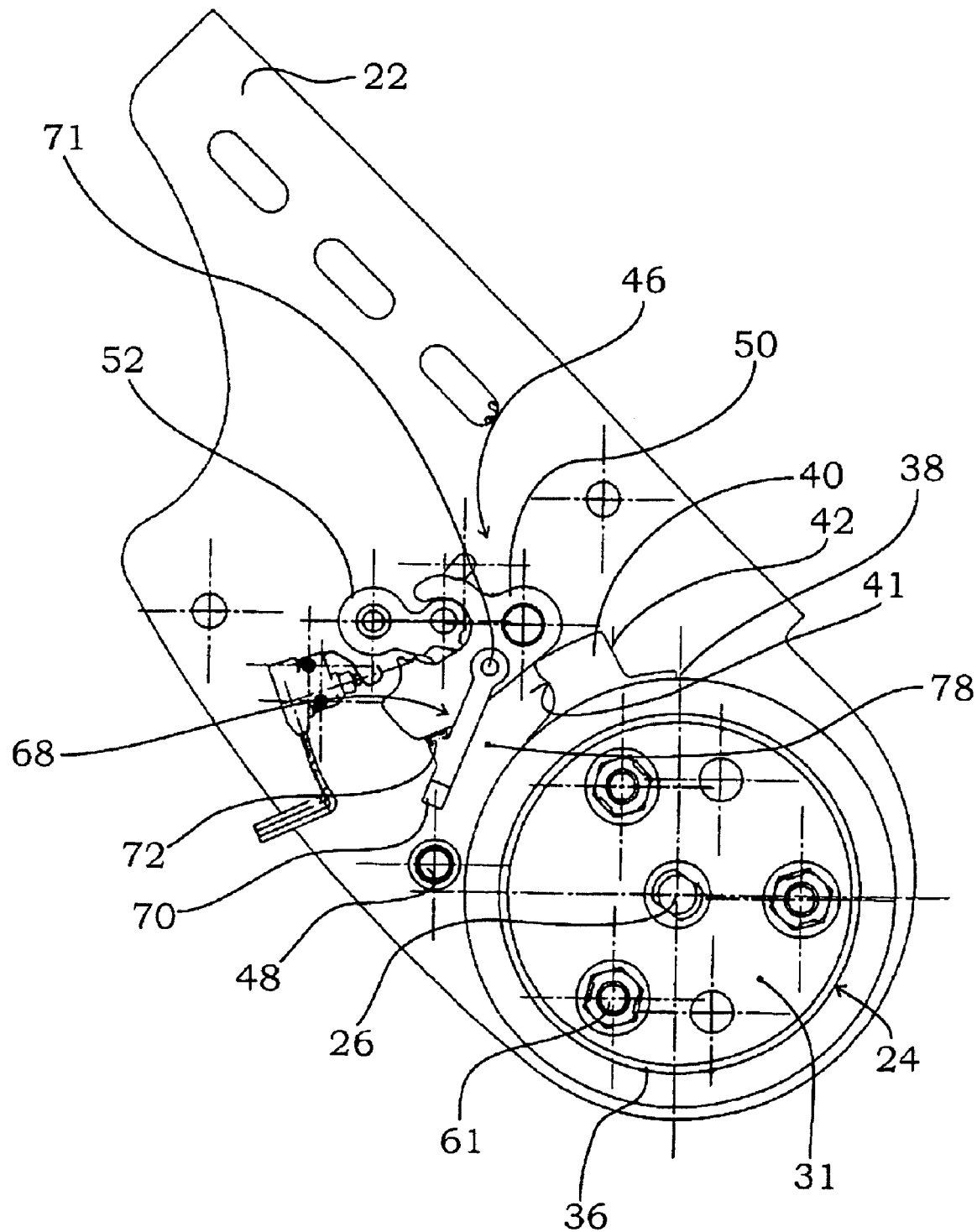
FIG. 5 shows a side view in accordance with FIG. 4, but now in the 45° angle forward folded position.
Figure 6:
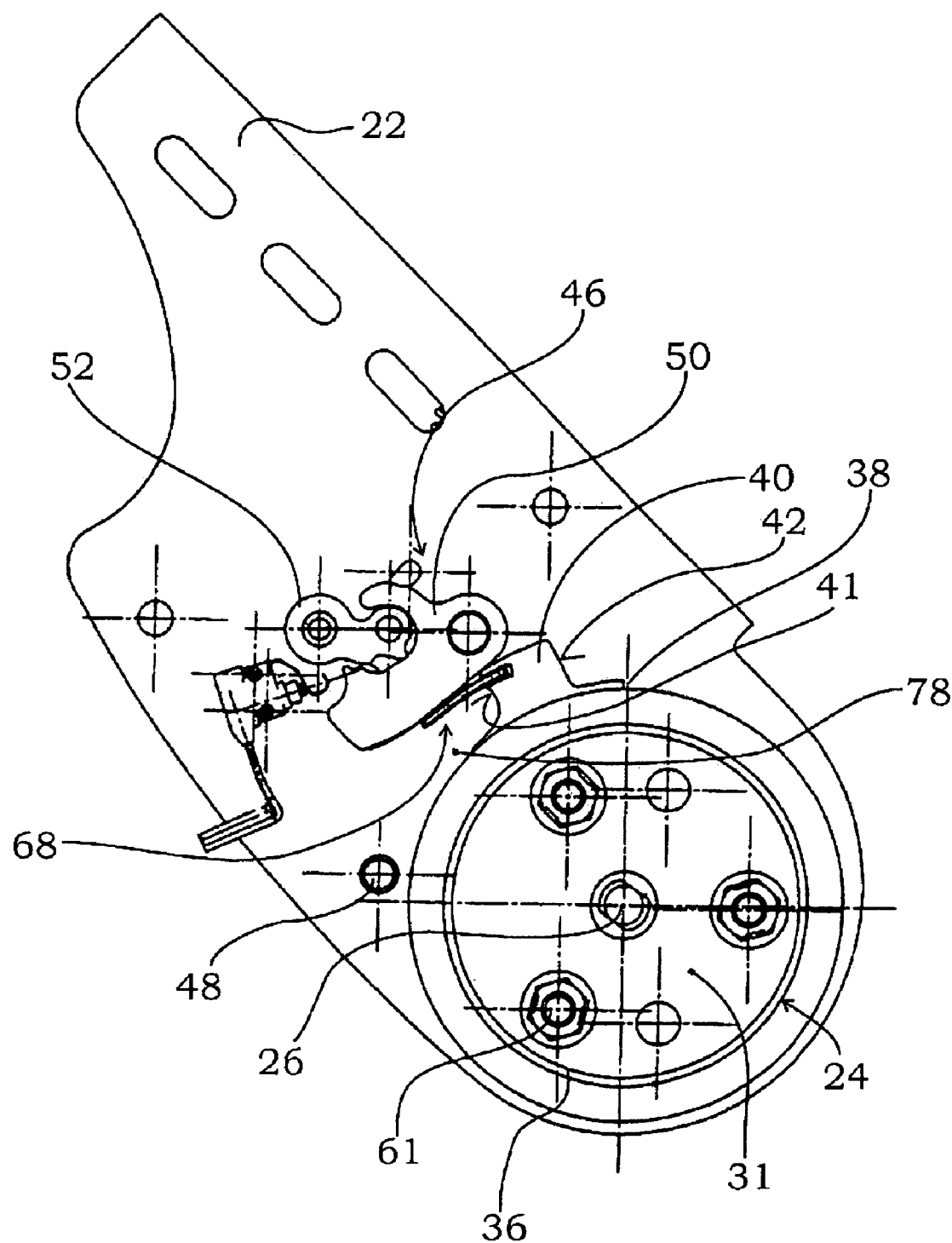
FIG. 6 shows a side view like FIG. 5 but with a modified implementation of the retainer device.

The implementation shown in the FIGS. 1 through 3 is a first exemplary embodiment. The FIGS. 4 and 5 show a second exemplary embodiment, FIG. 6 shows a third exemplary embodiment; these two last embodiments are configured to be similar to the first one and will be substantially discussed together with this first one.

The FIGS. show a seat back hinge mounting of a motor vehicle seat; it has a first hinge arm 21, a second hinge arm 22 and a round member 24 interposed between these two hinge arms 21, 22. The seat back hinge has a hinge pin 26 about which the two hinge arms 21, 22 are relatively pivotal. The first hinge arm 21 is connected to an underframe 28 of the vehicle seat, with the FIGS. 1 and 2 substantially showing a seat part of the underframe 28. The second hinge arm 22 is solidly connected to a seat back 30 of the motor vehicle seat. The round member 24, which can be seen from the FIGS. 5 and 6, has a first round plate 31 and a second round plate 32. Between these two, there is interposed a stop device 34 for stopping the two round plates 31, 32 relative to each other but also for adjusting their relationship. This stop device 34 is known per se and needs not be discussed in further detail.

A clamp 36 forms a partial grip around the rim of the two round plates 31, 32. This clamp 36 holds the two round plates 31, 32 together while also allowing them to rotate relative to one another.

This clamp 36 has a cutout 38 that is preferably configured to be a window. This is not a limitation, though. Instead, the cutout 38 can also be any type of opening; for example, a clamp 36 configured in the shape of a partial ring may generally have an opening forming the cutout. It is preferred that said cutout 38 be a radial opening extending in the plane of the two round plates 31, 32 although it may also extend across said plane.

A retainer lug 40 projects from the second round plate 32. In the circumferential direction, said lug has two radially extending stop flanges 41, 42 which bound the retainer lug 40 in the circumferential direction. The angular spacing between these two stop flanges 41, 42 is matched to the angular spacing of the side rims bounding the cutout 38 in such a manner that the retainer lug 40 is allowed to pivot within the cutout 38 about the very angle the seat back needs to pivot from the normal position of utilization (not shown) in the forward moved position (FIG. 1), although this is not compulsory. The cutout 38 may also be smaller or larger. The clamp may move together with the retainer lug 40. The second round plate 32 may also comprise a retainer bight that is bounded and defined by two confronting stop flanges 41, 42. It is to be understood as a kinematic inversion of the retainer lug 40 shown in the FIGS. 1 through 3.

On the second hinge arm 22, there is configured a releasable locking device 46 that will be discussed herein after. It cooperates with the stop flanges 41, 42.

As shown in particular in the FIGS. 1 and 2, this locking device 46 comprises a limit stop 48 that in this instance is configured in the form of a pin and is solidly connected to the second hinge arm 22. In the illustration shown in FIG. 1, it is spaced a clear distance apart from said stop flange 41, with said spacing also corresponding to the pivot angle of the seat back 30. Other configurations of the limit stop are possible.

In the normal position of utilization of the seat back 30, the second stop flange 42 is in contact with a locking cam 50 of the locking device 46. It cooperates with a control arm 52 that is also pivotally disposed on the second hinge arm 22. The latter can be actuated by a Bowden cable 54 that communicates with a disengagement lever 56. The disengagement lever 56 is provided in a known manner on the seat back 30. In the configuration shown in the FIGS. 2 and 3, the Bowden cable 54 does not directly act onto the control arm 52, an approximately triangular intermediate lever is provided instead. The spring of the intermediate lever, which is shown, also acts onto the locking cam 50.

As shown in the FIGS. 2 and 3, a hole 58 for receiving the hinge pin 26 is provided in the second hinge arm 22. Concentrically therewith, there are formed three long holes 60 through which spacer means 66 extend that are inserted via screw necks 62 projecting from the second round plate 32 and serving to fasten them. Nuts, which are located outside the long holes 60, are screwed onto these screw necks 62. Within the long holes 60, the screw necks 62 may pivot the angle desired for forward movement of the seat.

As further shown in the FIGS. 2 and 3, a plate 64 is associated with the second hinge arm 22, said plate carrying and receiving, just like the second hinge arm 22, the component parts of the locking device 46 while simultaneously performing the function of a housing part surrounding and protecting the component parts of the locking device 46.

On this plate 64, there is disposed a retainer device 68. For this purpose, a pin journal 71 on which the retainer device 68 is pivotally disposed projects from the plate 64. The retainer device has a control arm 70 and a retainer arm 72. The control arm 70 extends through a window 74 of the plate 64, an opening 76 in the plate 64 is associated with the retainer arm 72. The retainer device 68 is substantially configured to be a flat part made from sheet metal, preferably from spring steel. The control arm 70 cooperates with the retainer lug 40. The retainer arm 72 cooperates with the locking cam 50, more specifically with a flange of this locking cam 50 that is turned toward the round member 24. As can be seen from the FIGS., the retainer device 68 is located outside of the plate 64 although, in another embodiment, it may also be provided within said plate or on the second hinge arm 22. If it is disposed outside of a part such as 64, it is protected by suitable, additional means (not shown) so that its movement will not be blocked.

The control arm 70 is located within the range of motion of the retainer lug 40. If, starting from the forward folded position shown in FIG. 5, the seat back 30 and, as a result thereof, the second hinge arm 22 is pivoted rearward in the clockwise direction (into the normal position of utilization), the retainer lug 40 comes into contact with the control arm 70. By doing so, the retainer lug 40 pushes the control arm 70 out of its range of motion so that the control arm 70 then rests on an axial side face (the upper visible axial surface of the retainer lug 40 in FIG. 5) of the retainer lug 40. In the thus reached position, which corresponds to the normal position of utilization of the seat back 30, the retainer device 68 is deflected from its normal position. As a result, the retainer arm 72 is also deflected upward from the plane in FIG. 5. All this occurs against the force of the leaf spring forming the retainer device 68.

In the position shown in FIG. 5, the retainer arm 72 fits against the lower flange or against the lower boundary line of the locking cam 50. As a result, the locking cam 50 is retained in the position shown in FIG. 5. The locking cam 50 is biased by a spring in its stop position. It is urged against the retainer arm 72 by the force of said spring. As soon as the retainer arm 72 pivots laterally away because it is carried along with the control arm 70 to which it is connected, the locking cam 50 is free to move into the stop position.

The retainer device 68 prevents the locking cam 50 from falling into a "forbidden region 78" as soon as the locking cam 50 is pivoted counter-clockwise so far with respect to the retainer lug 40 that it could actually pivot in front of the first stop flange 41 during forward movement of the seat back. This applies provided the disengagement lever 46 is no longer actuated, meaning the locking cam 50 is no longer actively pulled free. What has been termed the "forbidden region 78" is defined by an arc of a circle about the hinge pin 26 and by the radius of the free end of the retainer lug 40. It is further defined by the first stop flange 41 and the limit stop 48.

FIG. 6 shows another embodiment of the retainer device 68. In this instance, a tongue-shaped retainer device 68 is fastened to the retainer lug and in proximity to the free end thereof, said retainer device projecting circumferentially in the counter-clockwise direction and being located so far radially outside that it cannot come into contact with the limit stop 48. It is substantially configured to be a leaf spring. Other alternatives are possible. For example, a helical compression spring abutting the limit stop 48 and the first stop flange and extending in the circumferential direction may be provided in the "forbidden region 78". It preferably abuts beyond the limit stop 48 (when viewed in the counter-clockwise direction of rotation) so that, in the completely compressed condition, it remains beyond the actual limit stop surface and does not hinder direct contact between the limit stop 48 and the first stop flange 41. Finally, the tongue-shaped retainer device 68 described in FIG. 6 may also be pivotally hinged to the retainer lug 40 and be biased against the control arm by a suitable spring. The force of the spring is thereby chosen to be so high that the counteracting resilient force of the locking cam 50 will not come into effect.

The disclosure content of the patent application filed today "Hinge Mounting for Motor Vehicle Seats and Having a Round Member" by the same applicant is fully incorporated herein by reference.

What is claimed is:

1. A seat back hinge mounting for a forwardly foldable motor vehicle seat comprising: a first hinge arm and a second hinge arm adapted for relative rotation about a hinge pin, a locking cam, which is disposed on said second hinge arm and is movable between a locking position and a release position, a first stop flange and a second stop flange being provided on said first hinge arm and said locking cam cooperating with said second stop flange in the locking position and does not cooperate with said second stop flange in the release position, wherein a retainer lug, which is bound in a circumferential direction by said first stop flange and by said second stop flange, is provided on said first hinge arm;

a limit stop cooperating with said first stop flange and being spaced in a same radial distance apart from said hinge pin as said first stop flange is disposed on said second hinge arm; and a retainer device that prevents said locking cam from moving from the release position into a forbidden region defined by an area bounded by (i) an arc of a circle about said hinge pin having a radius extending from said hinge pin to a free end of said retainer lug, (ii) a line extending from said hinge pin to said limit stop and (iii) a second line extending from said hinge pin to said first stop flange.

2. The hinge mounting as set forth in claim 1, wherein, if the locking cam is in the locking position, a distance measured in the circumferential direction between the first stop flange and the second stop flange of the retainer lug corresponds to a distance between the locking cam and the limit stop.

3. The hinge mounting as set forth in claim 1, wherein a spring is associated with the locking cam, said spring elastically biasing the locking cam in the locking position.

4. The hinge mounting as set forth in claim 1, wherein the locking cam is disposed on the second hinge arm so as to be pivotal about a cam axle.

5. The hinge mounting as set forth in claim 4, wherein the cam axle is spaced a greater distance apart from the hinge pin than the free end of the retainer lug.

6. The hinge mounting as set forth in claim 5, wherein a disengagement lever is provided on the seat back and that there is provided a slaving means connecting the disengagement lever to the control arm.

7. The hinge mounting as set forth in claim 1, wherein there is provided a control arm disposed on the second hinge arm so as to be pivotal about a control arm axle and comprising a control region and that a slaving region cooperating with said control region is formed on the locking cam.

8. The hinge mounting as set forth in claim 1, wherein the retainer device comprises a control arm and a retainer arm.

9. The hinge mounting as set forth in claim 1, wherein the retainer device retains the locking cam in its release position.

10. The hinge mounting as set forth in claim 1, wherein there is provided a round member that is interposed between the first hinge arm and the second hinge arm, the round member comprising: (a) a first round plate connected to the first hinge arm; (b) a second round plate associated with the second hinge arm; (c) a clamp forming a partial grip around a rim of the two round plates to hold them together; and (d) a stop device located between the two round plates.

11. The hinge mounting as set forth in claim 10, wherein the clamp comprises a cutout for a stopper nose to extend through.

12. The hinge mounting as set forth in claim 1, wherein there is provided a plate that is connected to the second hinge arm and has a window as well as an opening for the retainer device.

* * * * *